United States Patent
Eber et al.

(10) Patent No.: US 9,835,206 B2
(45) Date of Patent: Dec. 5, 2017

(54) SELECTABLE ONE-WAY CLUTCH WITH TORQUE INDEPENDENT RELEASE ELEMENT

(71) Applicant: GM Global Technology Operations LLC, Detroit, MI (US)

(72) Inventors: Kelly E. Eber, Oxford, MI (US); Todd R. Berger, Pinckney, MI (US); Christopher G. Benson, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 271 days.

(21) Appl. No.: 14/934,220

(22) Filed: Nov. 6, 2015

(65) Prior Publication Data
US 2017/0130784 A1    May 11, 2017

(51) Int. Cl.
*F16D 11/06*    (2006.01)
*F16D 41/16*    (2006.01)
*F16D 41/12*    (2006.01)
*F16D 45/00*    (2006.01)

(52) U.S. Cl.
CPC .......... *F16D 41/16* (2013.01); *F16D 41/125* (2013.01); *F16D 45/00* (2013.01)

(58) Field of Classification Search
CPC ......... F16D 41/16; F16D 45/00; F16D 41/125
See application file for complete search history.

(56) References Cited

U.S. PATENT DOCUMENTS

| | | | |
|---|---|---|---|
| 7,464,801 B2 | 12/2008 | Wittkopp | |
| 7,491,151 B2 | 2/2009 | Maguire | |
| 7,694,793 B2 | 4/2010 | Wittkopp | |
| 7,766,790 B2 | 8/2010 | Stevenson | |
| 7,824,292 B2 | 11/2010 | Samie | |
| 7,992,695 B2 | 8/2011 | Wittkopp | |
| 8,011,464 B2 | 9/2011 | Samie | |
| 8,042,669 B2 | 10/2011 | Samie | |
| 8,042,670 B2 * | 10/2011 | Bartos | F16D 41/16 192/43.1 |
| 8,056,690 B2 | 11/2011 | Samie | |
| 8,061,496 B2 | 11/2011 | Samie | |
| 8,083,042 B2 | 12/2011 | Samie | |
| 8,087,502 B2 | 1/2012 | Samie | |
| 8,196,724 B2 | 6/2012 | Samie | |
| 8,202,198 B2 | 6/2012 | Samie | |
| 8,267,231 B2 | 9/2012 | Holmes | |

(Continued)

*Primary Examiner* — David H Hlavka

(57) ABSTRACT

A one-way clutch includes a clutch body and body bore. A clutch plate stack includes first, second, and third clutch plates, the first and third clutch plates fixed to the clutch body. The second clutch plate rotates axially on a longitudinal axis. The first clutch plate includes a first strut cavity and the second clutch plate includes a second strut cavity. A forward strut is rotatably connected to the second clutch plate and biased toward the first clutch plate. The forward strut when positioned in the first strut cavity defines a clutch engaged position preventing second clutch plate rotation in a first rotational direction, while allowing rotation in a second rotational direction. A reverse strut slidably disposed in a strut bore extends through the third clutch plate, is partially positioned in the second strut cavity and is displaced in the strut bore during rotation of the second clutch plate.

20 Claims, 7 Drawing Sheets

(56) References Cited

U.S. PATENT DOCUMENTS

| | | |
|---|---|---|
| 8,276,725 B2 | 10/2012 | Swales |
| 8,296,020 B2 | 10/2012 | Lee |
| 8,297,421 B2 | 10/2012 | Mankame |
| 8,306,709 B2 | 11/2012 | Lee |
| 8,348,796 B2 | 1/2013 | Samie |
| 8,371,982 B2 * | 2/2013 | Lee .................. F16H 3/66 475/277 |
| 8,409,053 B2 | 4/2013 | Samie |
| 8,449,423 B2 | 5/2013 | Wilton |
| 8,478,498 B2 | 7/2013 | Lee |
| 8,494,738 B2 | 7/2013 | Lee |
| 8,655,525 B2 | 2/2014 | Samie |
| 8,702,555 B1 | 4/2014 | Hart |
| 8,870,705 B2 | 10/2014 | Diemer |
| 9,181,993 B1 | 11/2015 | Swales |
| 2004/0159517 A1 * | 8/2004 | Thomas ............. F16D 41/125 192/39 |
| 2015/0323020 A1 * | 11/2015 | Papania ............. F16D 41/16 74/665 GE |
| 2016/0265604 A1 * | 9/2016 | Magarida ........... F16D 41/125 |
| 2016/0281801 A1 * | 9/2016 | Magarida ........... F16D 41/125 |
| 2016/0305495 A1 * | 10/2016 | Itagaki ............... B60K 6/00 |

* cited by examiner

SELECTABLE ONE-WAY CLUTCH WITH TORQUE INDEPENDENT RELEASE ELEMENT

FIELD

The present disclosure relates to torque transmitting devices that are selectively engaged to achieve multiple gear ratios as well as forward and reverse operations in automobile transmissions.

BACKGROUND

The statements in this section merely provide background information related to the present disclosure and may or may not constitute prior art.

A multi-speed transmission can use a combination of clutches, planetary gear arrangements, and fixed interconnections to achieve a plurality of gear ratios. In one example, friction type clutches are used in the transmission, and are selectively engaged to achieve a particular gear ratio. However, when disengaged, friction clutches tend to produce drag when there is relative motion between the clutch input member and the output member, which can lead to decreased fuel economy.

In an effort to improve fuel economy, a one-way clutch may be selectively employed instead of a friction clutch to transmit power from a first input member to a second driven member. Known one-way clutches transmit torque in a first rotational direction and release or decouple in a second, opposite rotational direction. Once released, the driving member is free to rotate in the second opposite direction relative to the first direction, and the one-way clutch can overrun or freewheel. This allows the vehicle to travel in a coasting or gliding mode where the drivetrain is decoupled from the engine, thus eliminating any losses associated with the drivetrain turning the engine.

Engine braking occurs when torque to the driving member is reduced, but the driving member and the driven member remain coupled to one another. Back torque as a result of turning the engine with reduced power and pumping forces is therefore transmitted in an effort to reduce the speed of the driven member. However, freewheeling known one-way clutches either decouples the driven and the driving member, thereby making engine braking not possible, or the spring biased struts used to provide one-way rotation may bind, preventing release from the coupled condition. Thus, engine braking in a vehicle operated with known one-way clutches does not work unless additional components are included, such as an additional member activated to selectively decouple the driving member from the driven member.

Thus, while current transmissions achieve their intended purpose, there is a need for a new and improved transmission which exhibits improved performance while allowing engine braking.

SUMMARY

According to several aspects, a one-way clutch includes a clutch body including a body bore. A clutch plate stack is positioned in the body bore, the clutch plate stack having a plurality of clutch plates, including at least a first clutch plate, a second clutch plate, and a third clutch plate. The first clutch plate includes a forward strut cavity and the second clutch plate includes a reverse strut cavity. The forward strut cavity and the reverse strut cavity both face toward the third clutch plate. A forward strut is rotatably connected to the second clutch plate and when releasably positioned in the forward strut cavity defines a clutch engaged position preventing axial rotation of the first clutch plate in a first rotational direction, while allowing axial rotation in an opposite second rotational direction. A reverse strut is slidably disposed within a strut bore created in the third clutch plate. The reverse strut is partially positioned in the reverse strut cavity and is displaced in the strut bore during rotation of the second clutch plate in the second rotational direction.

In an additional aspect of the present disclosure, the plurality of clutch plates includes a fourth clutch plate axially rotatable with respect to a longitudinal axis of the clutch body, the fourth clutch plate including a U-shaped cavity facing the third clutch plate, the U-shaped cavity positioned in either a first position or a second position by axial rotation of the fourth clutch plate.

In another aspect of the present disclosure, in the first position of the U-shaped cavity the reverse strut is prevented from entering the U-shaped cavity.

In another aspect of the present disclosure, in the second position of the U-shaped cavity a second end of the reverse strut is displaced into the U-shaped cavity during axial rotation of the fourth clutch plate in the second rotational direction allowing axial rotation of the second clutch plate in the second axial direction of rotation to release contact between the forward strut and the first clutch plate.

In another aspect of the present disclosure, a spacing between the third clutch plate and the fourth clutch plate is fixed and a length of the reverse strut is predetermined such that a first end of the reverse strut directly contacts the second clutch plate within the reverse strut cavity and the reverse strut is prevented from displacement within the strut bore by direct contact of a strut second end with a plate contact surface of the fourth clutch plate.

In another aspect of the present disclosure, the fourth clutch plate is axially rotatable with respect to the longitudinal axis over a rotational angle ranging between approximately five to approximately twenty degrees.

In another aspect of the present disclosure, each of the forward strut cavity and the reverse strut cavity include an angled surface, a horizontal surface oriented parallel to a second clutch plate first contact surface, and an end surface oriented perpendicular to the horizontal surface, the forward strut in direct contact with the horizontal surface and the end surface in the clutch engaged position.

In another aspect of the present disclosure, the second clutch plate includes a second contact surface which is substantially parallel to the second clutch plate first contact surface, the second contact surface positioned substantially parallel to a third clutch plate contact surface.

In another aspect of the present disclosure, the strut bore is oriented at an acute angle with respect to a third clutch plate contact surface, the acute angle ranging between approximately 15 degrees to approximately 60 degrees.

In another aspect of the present disclosure, the first clutch plate and the third clutch plate are rotationally fixed to the clutch body by meshing engagement of a plurality of body wall splines of the first clutch plate and the third clutch plate with body wall splines of the clutch body.

In another aspect of the present disclosure, both the first clutch plate and the third clutch plate are non-rotatably fixed with respect to the clutch body and the second clutch plate is positioned between the first and the second clutch plates and is axially rotatable with respect to a longitudinal axis of the clutch body.

In another aspect of the present disclosure, a reverse strut plate has the reverse strut fixed to the reverse strut plate.

In another aspect of the present disclosure, the strut bore is oriented at an acute angle with respect to a third clutch plate contact surface and wherein the reverse strut plate is displaced away from the third clutch plate during rotation of the second clutch plate in the second rotational direction.

In another aspect of the present disclosure, a biasing member acts to bias the forward strut toward the first clutch plate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
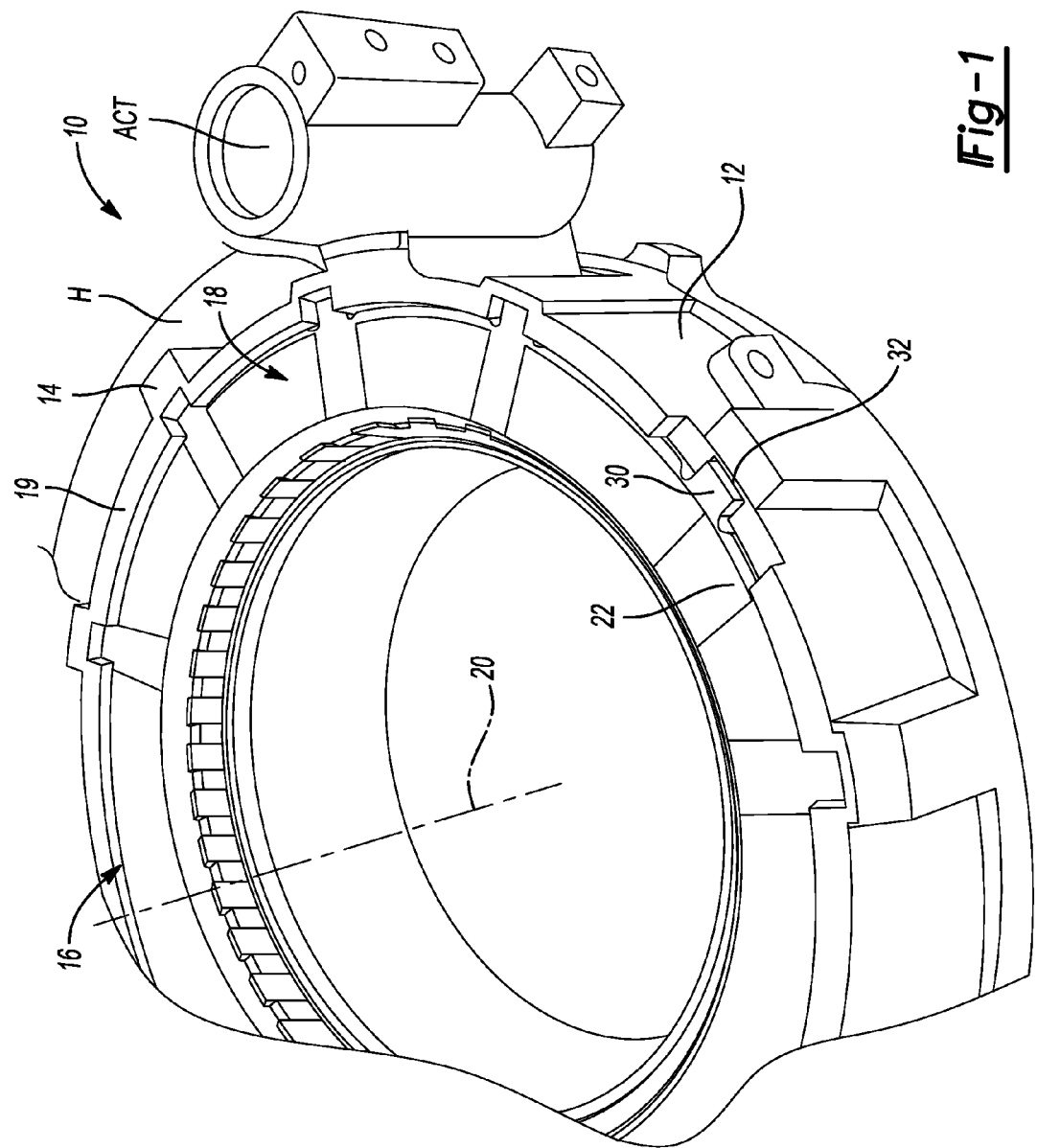
FIG. 1 is a front left perspective view of a one-way clutch assembly of the present disclosure.

Referring to FIG. 1, a one-way clutch assembly 10 according to a first aspect includes a clutch body 12 having clutch body splines 14 used to non-rotationally fix the clutch body 12 into a transmission housing "H", only partially shown for clarity. The clutch body 12 includes a body bore 16 within which is received a clutch plate stack 18. The clutch plate stack 18 contacts a body wall 19 defined by the body bore 16 to retain the clutch plate stack 18. The clutch plate stack is centrally disposed with respect to a central longitudinal axis 20 of the clutch body 12, which is coaxially aligned with a central longitudinal axis of the transmission housing "H". An actuating member "ACT" connected to the body wall 19 can be operated to change an operating condition of the clutch plates of the clutch plate stack 18.

Referring to FIG. 2 and again to FIG. 1, the clutch plate stack 18 includes a plurality of clutch plates, including a first clutch plate 22, a second clutch plate 24, a third clutch plate 26, and a fourth clutch plate 28. Each of the clutch plates 22, 24, 26, 28 is either non-rotationally fixed or is rotationally disposed with respect to the body wall 19. The first clutch plate 22 includes a plurality of perimeter wall splines 30 which mesh with individual body wall splines 32 created on the body wall 19 of the clutch body 12, thereby non-rotationally fixing the first clutch plate 22. The first clutch plate 22 includes a first or forward strut cavity 34 extending inwardly from a generally planar first plate contact surface 36. The first plate contact surface 36 is positioned parallel to a second plate first contact surface 38 of the second clutch plate 24. The forward strut cavity 34 includes an angled surface 40 which transitions into a horizontal surface 42 oriented substantially parallel to the first plate contact surface 36. An end surface 44 is oriented substantially perpendicular to the horizontal surface 42.

Figure 2:
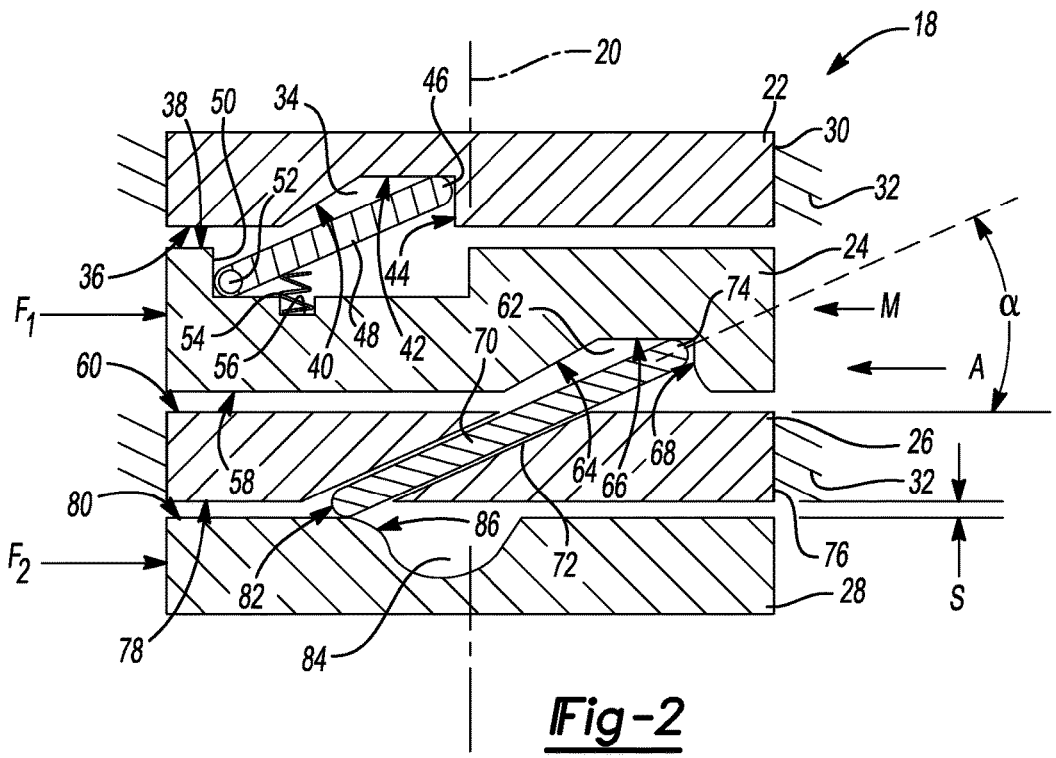
FIG. 2 is a cross sectional end elevational view taken at section 2 of FIG. 1, in a one-way activated or locked position.

In an engaged position of the second clutch plate 24 shown in FIG. 2, a strut end 46 of a forward strut 48 directly contacts the horizontal surface 42 and the end surface 44 of the forward strut cavity 34, thereby preventing axial rotation of the second clutch plate 24 by a first axial force $F^1$ applied to the second clutch plate 24. An opposite end of the forward strut 48 is rotatably coupled to the second clutch plate 24 within a strut pocket 50 by a hinge 52. The first strut 48 is biased toward the first strut engaged position shown by a biasing force of a biasing member 54, such as a coiled spring, retained within a biasing member cavity 56. The biasing member 54 biases the strut end 46 toward the forward strut cavity 34. The actuating member "ACT" shown and described in reference to FIG. 1 connected to the hinge 52 can be operated to oppositely rotate the forward strut 48 back toward and into strut pocket 50 against the biasing force of the biasing member 54 when the strut end 46 is not frictionally captured against the horizontal surface 42 and the end surface 44.

When the forward strut 48 is engaged as shown, the forward strut 48 prevents the second clutch plate 24 from axially rotating in the direction of the first axial force $F_1$, and drive torque can thereby be reacted between the first clutch plate 22 and the second clutch plate 24. At this position, the second clutch plate is also prevented from axial rotation in an opposite direction of rotation "A" as will be described below. The strut end 46 is preferably a rounded surface to minimize sliding friction between the strut end 46 and the surfaces of the forward strut cavity 34, as well as against the first plate contact surface 36 during axial rotation of the second clutch plate 24. It should however be evident from the engaged configuration of the forward strut 48, that frictional contact of the strut end 46 with both the horizontal surface 42 and the end surface 44 precludes release of the forward strut 48 unless some axial rotation of the second clutch plate 24 in the direction of rotation "A" with respect to the first clutch plate 22 first occurs that will allow the forward strut 48 to rotate about the hinge 52 with clearance between the strut end 46 and the end surface 44.

To provide the necessary axial displacement of the second clutch plate 22 to release the forward strut 48, a release mechanism "M" is provided. The release mechanism "M"

includes features provided with each of the second clutch plate 24, the third clutch plate 26, and the fourth clutch plate 28 as follows. The second clutch plate 22 includes a second plate second contact surface 58 which is substantially parallel to the second plate first contact surface 38. The second plate second contact surface 58 is positioned substantially parallel to a third plate first contact surface 60 of the third clutch plate 26. The second clutch plate 24 includes a second or reverse strut cavity 62 created in the second plate second contact surface 58 and is therefore oppositely directed with respect to the strut pocket 50. Similar to the forward strut cavity 34, the reverse strut cavity 62 includes an angle surface 64, a horizontal surface 66 oriented parallel to the second plate second contact surface 58, and an end surface 68 oriented perpendicular to the horizontal surface 66.

A reverse strut 70 defining a torque independent release element is slidably disposed within a strut bore 72 created in the third clutch plate 26. Use of the reverse strut 70 permits release of the forward strut 48 even if the forward strut 48 is held in direct contact with both the horizontal surface 42 and the end surface 44 of the forward strut cavity 34 by rotational force acting against the second clutch plate 24. The strut bore 72, and therefore the reverse strut 70 are angularly oriented with respect to the third plate first contact surface 60 defining an acute angle α, which according to several aspects can range between approximately 15 degrees to approximately 60 degrees, and is preferably approximately 30 degrees. With the reverse strut 70 positioned as shown, a strut first end 74, which is preferably rounded in shape directly contacts the horizontal surface 66, but is spaced away from direct contact with the end surface 68. The third clutch plate 26 is rotationally fixed to the clutch body 12 by meshing engagement of a plurality of body wall splines 76 of the third clutch plate with the body wall splines 32 of the clutch body 12. The third clutch plate 26 includes a third plate second contact surface 78 which is oriented substantially parallel to the third plate first contact surface 60. The third plate second contact surface 78 is oriented substantially parallel to a fourth plate first contact surface 80 of the fourth clutch plate 28.

A length of the reverse strut 70 is predetermined such that the reverse strut 70 is retained in the contact position shown by direct contact of a strut second end 82 with the fourth plate first contact surface 80. The strut second end 82 also preferably has a rounded shape. The fourth clutch plate 28 includes a U-shaped cavity 84 created in the fourth plate first contact surface 80. A cavity transition surface 86 positioned proximate to the strut second end 82 provides a rounded surface which minimizes sliding friction to allow the strut second end 82 to slide into the U-shaped cavity 84 which will be described in reference to FIGS. 3-5. The fourth clutch plate 28 is axially rotatable with respect to the longitudinal axis 20 over a rotational angle ranging between approximately five to approximately twenty degrees. A spacing "S" between the third clutch plate 26 and the fourth contact plate 28 is fixed which prevents sliding motion of the reverse strut 70 in the strut bore 72 at the engaged position of FIG. 2. A second axial force $F_2$ applied to the fourth clutch plate 28 prevents axial rotation of the fourth clutch plate 28 and thereby retains the rotationally locked or engaged position of the clutch plates 24, 28.

Referring to FIG. 3 and again to FIGS. 1 through 2, to release the forward strut 48 from its engaged position, a third axial force $F_3$ applied to the fourth clutch plate 28 initiates axial rotation of the fourth clutch plate 28 in the direction of rotation "A". The strut second end 82 moves into contact with the cavity transition surface 86, allowing the reverse strut 70 to axially displace in a direction "B" within the strut bore 72. This translation of the reverse strut 70, together with application of a fourth axial force $F_4$ applied to the second clutch plate 24 in the direction of rotation "A" allows the second clutch plate 24 to begin axial rotation, displacing the strut end 46 of the forward strut 48 away from the end surface 44. At this time, the strut first end 74 of the reverse strut 70 slides down the end surface 68 and comes into direct contact with a curved transition surface 88 of the reverse strut cavity 62.

Figure 3:
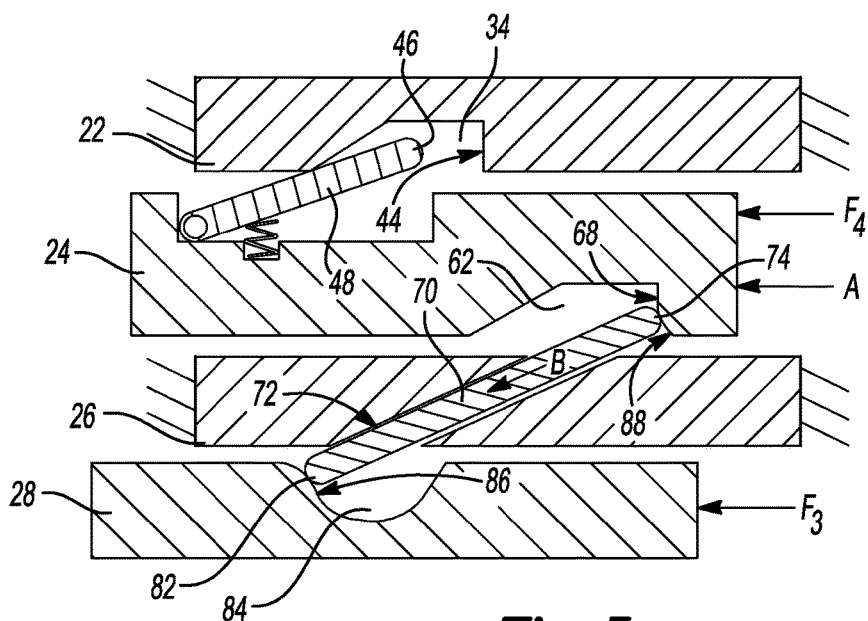
FIG. 3 is a cross sectional end elevational view modified from FIG. 2 to show initial translation away from the locked position.

Referring to FIG. 4 and again to FIG. 3, with further application of the third axial force $F_3$ to the fourth clutch plate 28, the strut second end 82 transitions from contact with the cavity transition surface 86 into the U-shaped cavity 84, allowing the reverse strut 70 to further axially displace in the direction "B" within the strut bore 72. The strut first end 74 of the reverse strut 70 continues to slide down the curved transition surface 88 of the second strut cavity 62 toward the second plate second contact surface 58, and the reverse clutch plate 24 continues to rotate in the axial direction of rotation "A".

Figure 4:
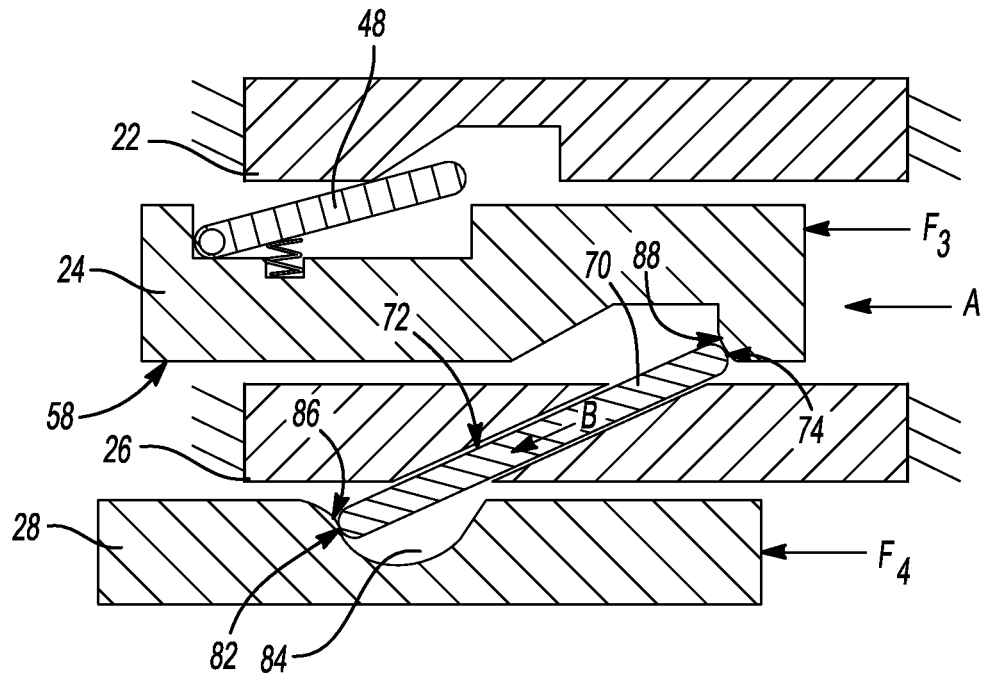
FIG. 4 is a cross sectional end elevational view further modified from FIG. 3 during further translation away from the locked position.
Figure 5:
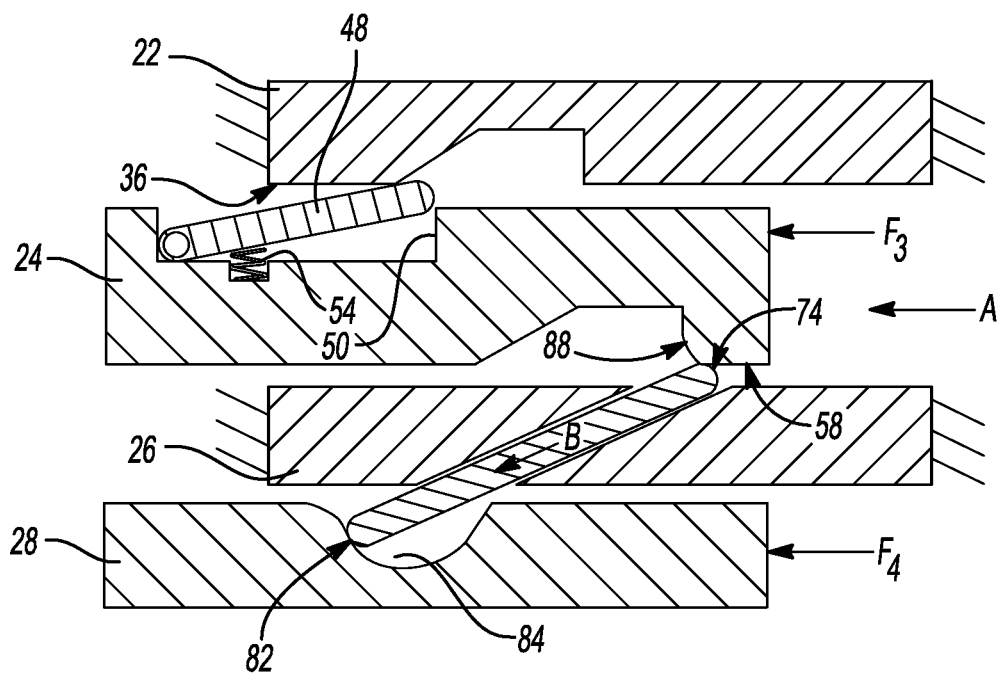
FIG. 5 is a cross sectional end elevational view further modified from FIG. 4 showing the one-way clutch in an unlocked or open position.

Referring to FIG. 5 and again to FIGS. 3 through 4, a clear or free spinning position of the second clutch plate 24 is reached when the strut second end 82 fully transitions into the U-shaped cavity 84 and the reverse strut 70 axially displaces in the direction "B" until the strut first end 74 is in sliding contact with the second plate second contact surface 58. At this time, the forward strut 48 can contact the first plate contact surface 36, deflecting the forward strut 48 into the first strut cavity 50, allowing free rotation of the second clutch plate 24 in the axial direction of rotation "A". At this position drive torque cannot be reacted between the first clutch plate 22 and the second clutch plate 24.

Referring to FIG. 6 and again to FIGS. 1 through 5, according to several aspects, a one-way clutch assembly 90 is similar to the one-way clutch assembly 10, having common components identified by an asterisk, therefore only the differences will be further discussed herein. The fourth clutch plate 28 and the reverse strut 70 of the one-way clutch assembly 10 are eliminated, and are replaced by a Y-shaped, one-piece reverse strut member 92. The reverse strut member 92 includes a reverse strut plate 92 which is oriented substantially parallel to the third clutch plate 26'. A reverse strut 96 is integrally connected or fixed to the reverse strut plate 92, and slidably extends into the strut bore 72' of the third clutch plate 26. Similar to the clutch engaged position shown in FIG. 2, in a clutch engaged position of the clutch assembly 90 a strut end 98 of the reverse strut 96 directly contacts the horizontal surface 66' of the reverse strut cavity 62' of the second clutch plate 24'. A fifth force $F_5$ applied perpendicular to the reverse strut plate 94, and therefore substantially perpendicular to the third plate second contact surface 78' of the third clutch plate 26' holds the clutch engaged position of the members of the clutch assembly 90. At the clutch engaged position, the reverse strut plate 94 is positioned with respect to the third plate second contact surface 78' at a spacing dimension "$E_1$".

Figure 6:
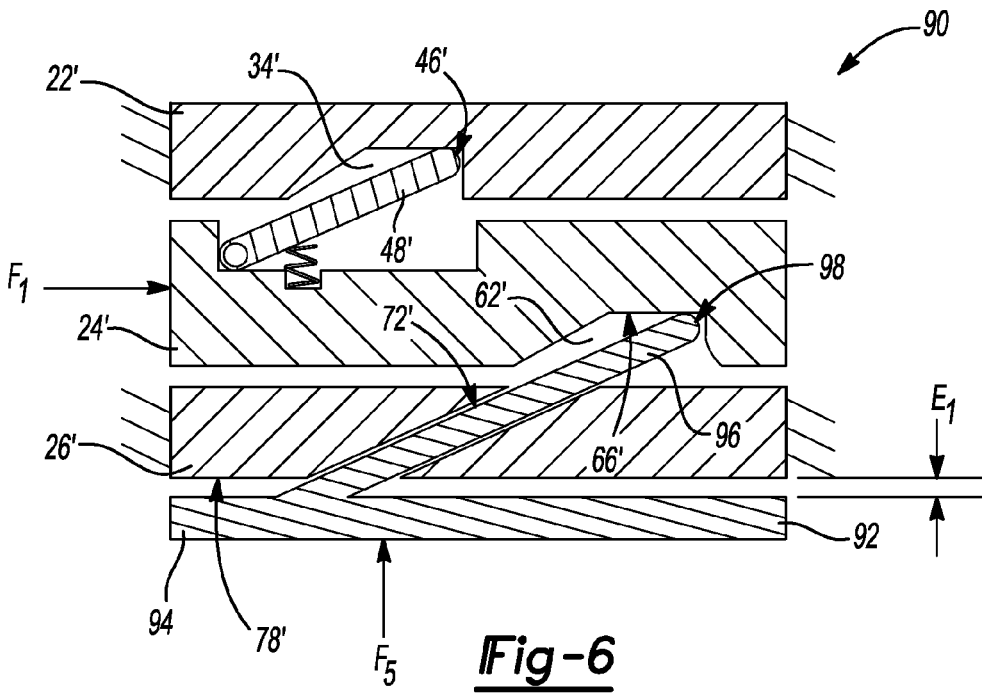
FIG. 6 is a cross sectional end elevational view similar to FIG. 2 showing another aspect of a one-way clutch assembly of the present disclosure in a one-way activated or locked position.

Referring to FIG. 7 and again to FIG. 6, to release the forward strut 48' from its engaged position, the fourth axial force $F_4$ applied to the second clutch plate 24' initiates axial rotation of the second clutch plate 24' in the direction of rotation "A". The strut end 98 slides along the horizontal surface 66' until contacting the end surface 88'. The fifth force $F_5$ is still actively being applied at this time.

Figure 7:
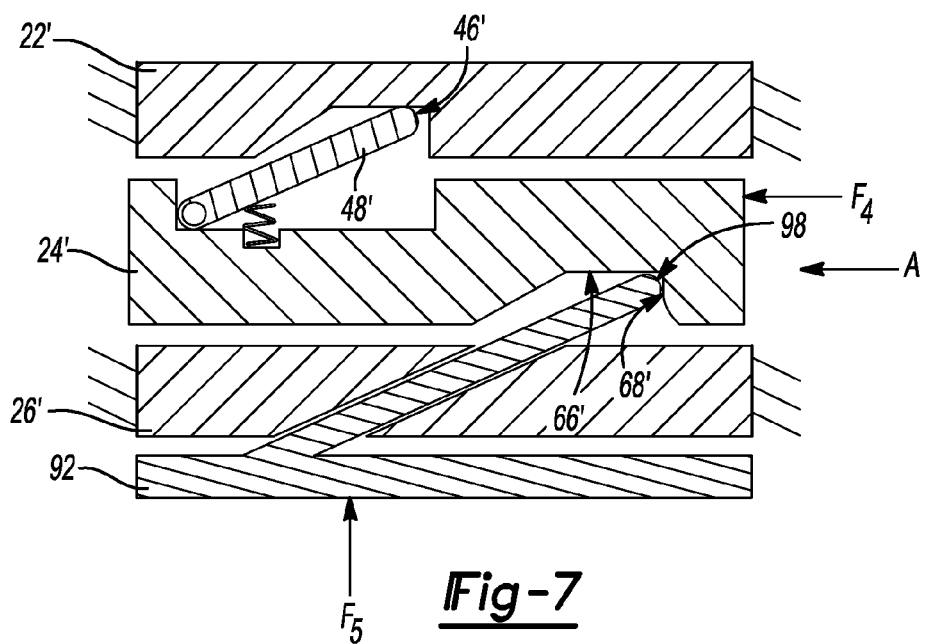
FIG. 7 is a cross sectional end elevational view modified from FIG. 6 to show initial translation away from the locked position.

Referring to FIG. 8 and again to FIGS. 6 through 7, fifth force $F_5$ is removed from the reverse strut member 92, and the fourth axial force $F_4$ continues to be applied to the second clutch plate 24'. Further axial rotation of the second clutch plate 24' in the axial direction of rotation "A" and direct contact between the strut end 98 with the end surface 68' causes the reverse strut 98 to translate within the strut bore 72' in the displacement direction "B". The plate member 94 translates in each of an axial rotational direction "C" and a longitudinal direction "D", thereby displacing the reverse strut plate 94 away from the third plate second contact surface 78' of the third clutch plate 26' to a new spacing dimension "$E_2$", which is greater than spacing dimension "$E_1$".

Figure 8:
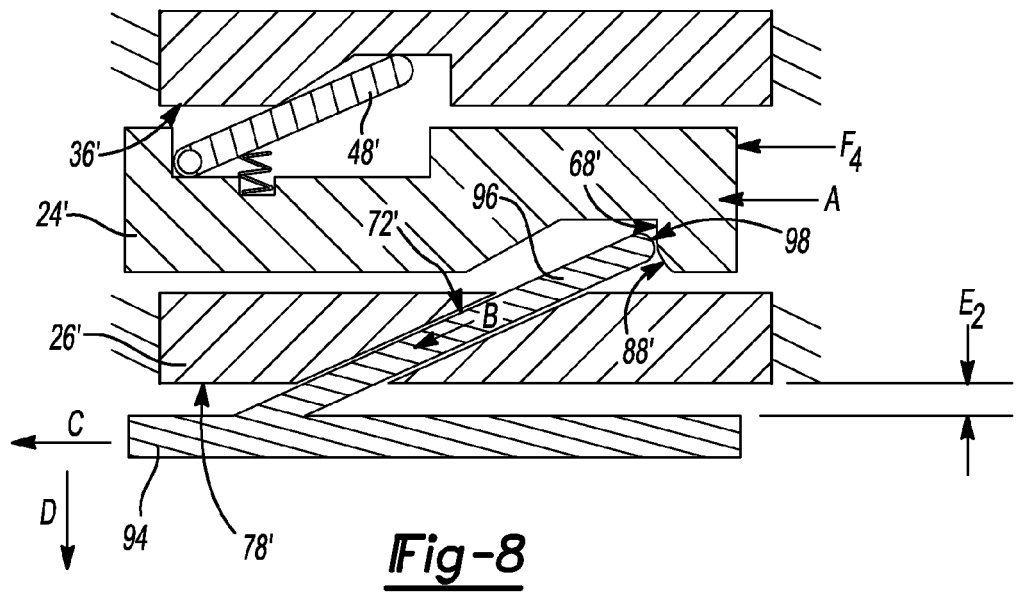
FIG. 8 is a cross sectional end elevational view further modified from FIG. 7 during further translation away from the locked position.
Figure 9:
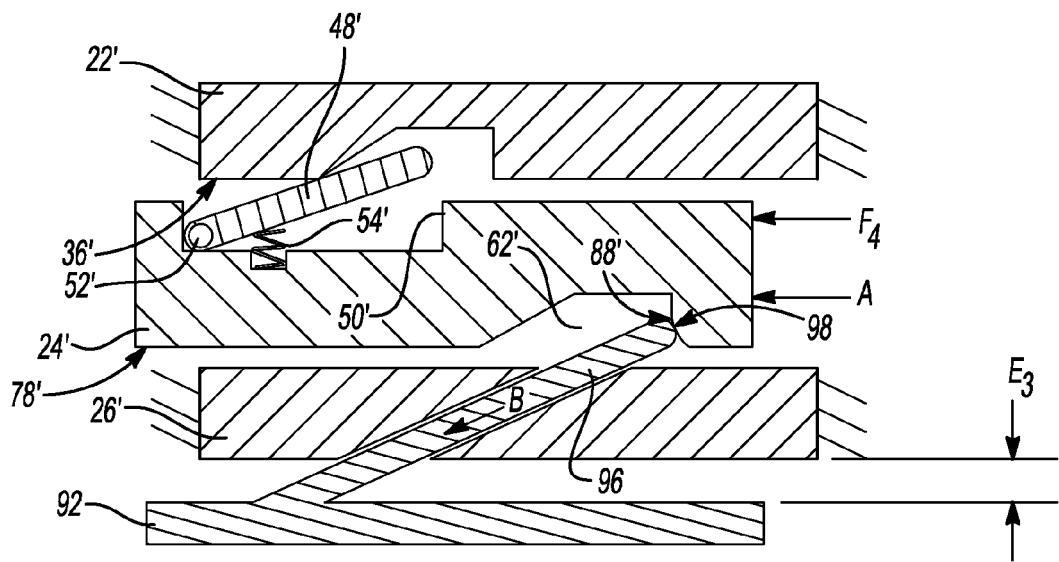
FIG. 9 is a cross sectional end elevational view further modified from FIG. 8 during further translation away from the locked position.

Referring to FIG. 9 and again to FIGS. 6 through 8, with further application of the fourth axial force $F_4$ to the second clutch plate 26', the strut end 98 of the reverse strut 96 slides along the curved transition surface 88' of the reverse strut cavity 62' toward the second plate second contact surface 58', and the second clutch plate 24 continues to rotate in the axial direction of rotation "A". The reverse strut 98 continues to translate within the strut bore 72' in the displacement direction "B", causing further displacement of the plate member 94 away from the third plate second contact surface 78' of the third clutch plate 26' to a new spacing dimension "$E_3$", which is greater than spacing dimension "$E_2$".

Figure 10:
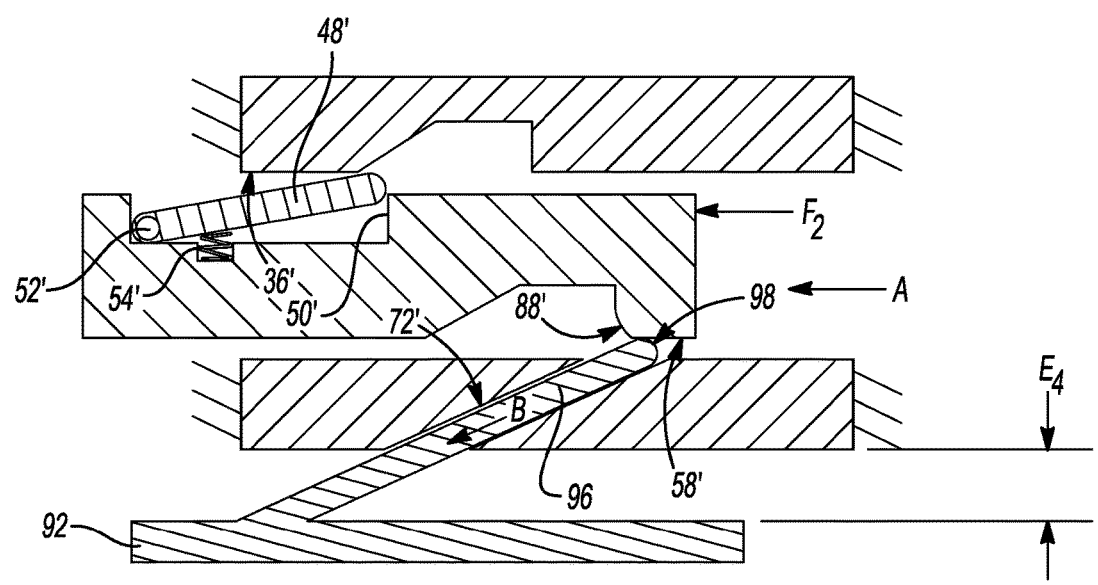
FIG. 10 is further modified from FIG. 6 showing the one-way clutch in an unlocked or open position.

Referring to FIG. 10 and again to FIGS. 6 through 9, a clear or free spinning position of the second clutch plate 24' is reached when the reverse strut 96 axially displaces in the direction "B" until the strut end 98 is in sliding contact with the second plate second contact surface 58'. The plate member 94 has moved away from the third plate second contact surface 78' of the third clutch plate 26' to a maximum spacing dimension "$E_4$", which is greater than spacing dimension "$E_3$". At this time, the forward strut 48' can contact the first plate contact surface 36', displacing the forward strut 48' at least partially into the first strut cavity 50', allowing free rotation of the second clutch plate 24' in the axial direction of rotation "A". At this position drive torque cannot be reacted between the first clutch plate 22' and the second clutch plate 24'.

With reference again to FIGS. 1 and 2, the first clutch plate 22 includes the plurality of perimeter wall splines 30 which individually mesh with one of the individual body wall splines 32 created on the body wall 19 of the clutch body 12, thereby non-rotationally fixing the first clutch plate 22 to the clutch body 12. The non-rotating third clutch plate 26 is similarly mounted.

Figure 11:
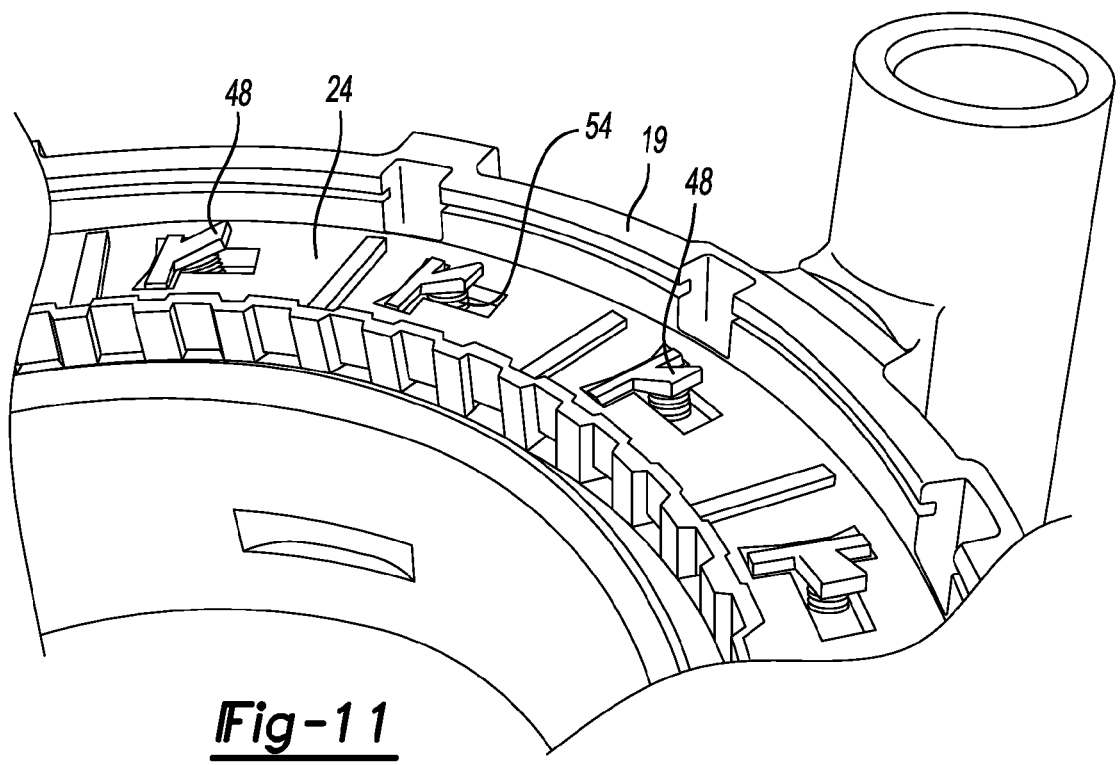
FIG. 11 is a front left perspective view of the one-way clutch assembly of FIG. 1, with the first clutch plate removed.

Referring to FIG. 11 and again to FIG. 1, multiple forward struts 48 are retained by the second clutch plate 24. With the first clutch plate 22 removed from the clutch plate stack 18 for clarity, the multiple forward struts 48 rotatably connected to the second clutch plate 24 are positioned in their outwardly biased, fully extended positions. The biasing members 54 continuously bias each of the forward struts 48 toward the fully extended positions.

Figure 12:
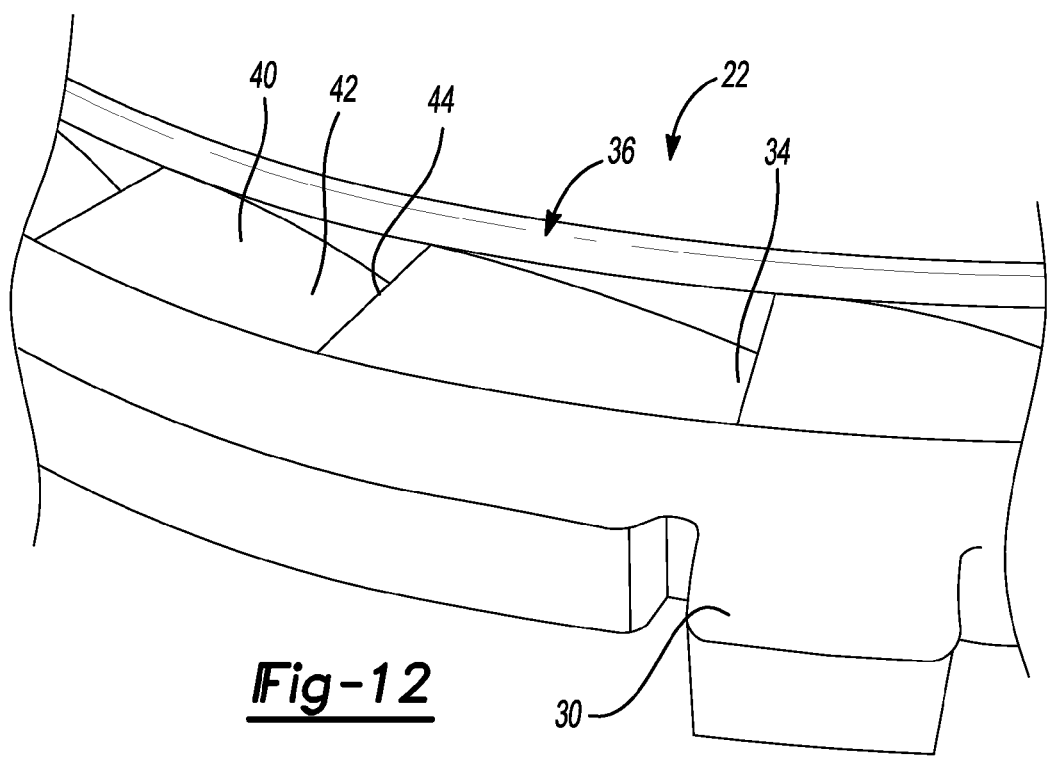
FIG. 12 is a bottom perspective view of the first clutch plate of the one-way clutch assembly of FIG. 1.

Referring to FIG. 12 and again to FIGS. 1 through 2, the first plate contact surface 36 of the first clutch plate 22 provides multiple, individual ones of the forward strut cavities 34. Each end surface 44 of one of the forward strut cavities 34 defines the beginning or transition to the angled surface 40 of a next successive one of the forward strut cavities 34. The perimeter wall splines 30 (one of which is visible in this view) define the maximum outward extent of the first clutch plate 22.

Upon activation of the activator ACT into the unlocked position, the selectable one-way clutch 10 operates in the same manner as a traditional one-way clutch. That is, the selectable one-way clutch assembly 10 allows for relative rotation between the input and output members of an automotive transmission in a first rotary direction "A", and prevents relative rotation between the input and output members in the opposite second rotary direction. Thus, when in the unlocked position, the one-way clutch assembly 10 allows for relative rotation in the first rotary direction "A" between a gear member such as a ring gear member of a planetary gear set of the transmission and the transmission housing "H". However, relative rotation between the ring gear member of the planetary gear set and the stationary member or transmission housing "H" is prevented in the second rotary direction.

According to several aspects of the present disclosure, a one-way clutch 10 includes a clutch body 12 including a body bore 16. A clutch plate stack 18 is positioned in the body bore 16. The clutch plate stack 18 has a plurality of clutch plates, including at least a first clutch plate 22, a second clutch plate 24, and a third clutch plate 26. The first clutch plate 22 and the third clutch plate 26 are fixed against axial rotation to the clutch body 12. The second clutch plate 24 is positioned between the first and the third clutch plates 22, 26 and is axially rotatable with respect to a longitudinal axis 20 of the clutch body 12. The first clutch plate 22 includes a first strut cavity 34 and the second clutch plate 24 includes a second strut cavity 62. The first strut cavity 34 and the second strut cavity 62 both face toward the third clutch plate 26. A forward strut 48 is rotatably connected to the second clutch plate 24 and is biased toward the first clutch plate 22 by a biasing member 54. The forward strut 48 when releasably positioned in the first strut cavity 34 defines a clutch engaged position preventing axial rotation of the second clutch plate 24 in a first rotational direction, while allowing axial rotation in an opposite second rotational direction "A". A reverse strut 70 defining a torque independent release element is slidably disposed within a strut bore 72 and extends entirely through the third clutch plate 26. The reverse strut 70 is partially positioned in the second strut cavity 62 and displaced in the strut bore 72 during rotation of the second clutch plate in the second rotational direction.

Employing a selectable one-way clutch assembly 10 typically improves fuel economy of a vehicle and reduces parts and complexity of the transmission. This is because a selectable one-way clutch has a lower amount of spin loss when compared to some other types of clutches that are commonly used in transmissions such as, for example, a friction type clutch. Moreover, employing a selectable one-way clutch 10 also allows for engine braking as well as gliding, without the need for additional components.

The description of the invention is merely exemplary in nature and variations that do not depart from the gist of the invention are intended to be within the scope of the invention. Such variations are not to be regarded as a departure from the spirit and scope of the invention.

What is claimed is:

1. A one-way clutch, comprising:
   a clutch body including a body bore;
   a clutch plate stack positioned in the body bore, the clutch plate stack having a plurality of clutch plates, including at least a first clutch plate, a second clutch plate, and a third clutch plate;
   the first clutch plate including a forward strut cavity and the second clutch plate including a reverse strut cavity, the forward strut cavity and the reverse strut cavity both facing toward the third clutch plate;
   a forward strut rotatably connected to the second clutch plate and when releasably positioned in the forward strut cavity defining a clutch engaged position preventing axial rotation of the second clutch plate in a first rotational direction, while allowing axial rotation in an opposite second rotational direction;

a reverse strut slidably disposed within a strut bore created in the third clutch plate, the reverse strut partially positioned in the reverse strut cavity and displaced in the strut bore during rotation of the second clutch plate in the second rotational direction.

2. The one-way clutch of claim 1, wherein the plurality of clutch plates includes a fourth clutch plate axially rotatable with respect to a longitudinal axis of the clutch body, the fourth clutch plate including a U-shaped cavity facing the third clutch plate, the U-shaped cavity positioned in either a first position or a second position by axial rotation of the fourth clutch plate.

3. The one-way clutch of claim 2, wherein in the first position of the U-shaped cavity the reverse strut is prevented from entering the U-shaped cavity.

4. The one-way clutch of claim 2, wherein in the second position of the U-shaped cavity a second end of the reverse strut is displaced into the U-shaped cavity during axial rotation of the fourth clutch plate in the second rotational direction allowing axial rotation of the second clutch plate in the second axial direction of rotation to release contact between the forward strut and the first clutch plate.

5. The one-way clutch of claim 2, wherein a spacing between the third clutch plate and the fourth clutch plate is fixed and a length of the reverse strut is predetermined such that a first end of the reverse strut directly contacts the second clutch plate within the reverse strut cavity and the reverse strut is prevented from displacement within the strut bore by direct contact of a strut second end with a plate contact surface of the fourth clutch plate.

6. The one-way clutch of claim 2, wherein the fourth clutch plate is axially rotatable with respect to the longitudinal axis over a rotational angle ranging between approximately five to approximately twenty degrees.

7. The one-way clutch of claim 1, wherein each of the forward strut cavity and the reverse strut cavity include an angled surface, a horizontal surface oriented parallel to a second clutch plate first contact surface, and an end surface oriented perpendicular to the horizontal surface, the forward strut in direct contact with the horizontal surface and the end surface in the clutch engaged position.

8. The one-way clutch of claim 7, wherein the second clutch plate includes a second contact surface which is substantially parallel to the second clutch plate first contact surface, the second contact surface positioned substantially parallel to a third clutch plate contact surface.

9. The one-way clutch of claim 1, wherein the strut bore is oriented at an acute angle with respect to a third clutch plate contact surface, the acute angle ranging between approximately 15 degrees to approximately 60 degrees.

10. The one-way clutch of claim 1, wherein the first clutch plate and the third clutch plate are rotationally fixed to the clutch body by meshing engagement of a plurality of body wall splines of the first clutch plate and the third clutch plate with body wall splines of the clutch body.

11. The one-way clutch of claim 1, wherein both the first clutch plate and the third clutch plate are non-rotatably fixed with respect to the clutch body and the second clutch plate is positioned between the first and the second clutch plates and is axially rotatable with respect to a longitudinal axis of the clutch body.

12. The one-way clutch of claim 1, further including a reverse strut plate having the reverse strut fixed to the reverse strut plate.

13. The one-way clutch of claim 12, wherein the strut bore is oriented at an acute angle with respect to a third clutch plate contact surface and wherein the reverse strut plate is displaced away from the third clutch plate during rotation of the second clutch plate in the second rotational direction.

14. The one-way clutch of claim 13, further including a biasing member acting to bias the forward strut toward the first clutch plate.

15. A one-way clutch, comprising:
a clutch body including a body bore;
a clutch plate stack positioned in the body bore, the clutch plate stack having a plurality of clutch plates, including at least a first clutch plate, a second clutch plate, and a third clutch plate, the first and the third clutch plates fixed against axial rotation to the clutch body, and the second clutch plate positioned between the first and the third clutch plates and axially rotatable with respect to a longitudinal axis of the clutch body;
the first clutch plate including a first strut cavity and the second clutch plate including a second strut cavity, the first strut cavity and the second strut cavity both facing toward the third clutch plate;
a forward strut rotatably connected to the second clutch plate and biased toward the first clutch plate by a biasing member, the forward strut when releasably positioned in the first strut cavity defining a clutch engaged position preventing axial rotation of the second clutch plate in a first rotational direction, while allowing axial rotation in an opposite second rotational direction;
a reverse strut defining a torque independent release element slidably disposed within a strut bore and extending entirely through the third clutch plate, the reverse strut partially positioned in the second strut cavity and displaced in the strut bore during rotation of the second clutch plate in the second rotational direction.

16. The one-way clutch of claim 15, wherein the plurality of clutch plates includes a fourth clutch plate axially rotatable with respect to the longitudinal axis, the fourth clutch plate including a U-shaped cavity facing the third clutch plate positioned in either a first position or a second position by axial rotation of the fourth clutch plate.

17. The one-way clutch of claim 16, wherein in the first position of the U-shaped cavity the reverse strut is prevented from entering the U-shaped cavity and in the second position of the U-shaped cavity a second end of the reverse strut is displaced into the U-shaped cavity during axial rotation of the fourth clutch plate in the second rotational direction allowing axial rotation of the second clutch plate in the second axial direction of rotation to release contact between the forward strut and the first clutch plate.

18. The one-way clutch of claim 15, wherein the forward strut is positioned partially within a strut pocket of the second clutch plate.

19. The one-way clutch of claim 18, wherein the forward strut is rotatably coupled to the second clutch plate within the strut pocket by a hinge.

20. A one-way clutch, comprising:
a clutch body including a body bore;
a clutch plate stack positioned in the body bore, the clutch plate stack having a plurality of clutch plates, including at least a first clutch plate, a second clutch plate, and a third clutch plate, the first and the third clutch plates fixed against axial rotation to the clutch body, and the second clutch plate positioned between the first and the third clutch plates and axially rotatable with respect to a longitudinal axis of the clutch body;

the first clutch plate including a first strut cavity and the second clutch plate including a second strut cavity, the first strut cavity and the second strut cavity both facing toward the third clutch plate;

a forward strut rotatably connected to the second clutch plate and biased toward the first clutch plate by a biasing member, the forward strut when releasably positioned in the first strut cavity defining a clutch engaged position preventing axial rotation of the second clutch plate in a first rotational direction, while allowing axial rotation in an opposite second rotational direction;

a reverse strut defining a torque independent release element slidably disposed within a strut bore created in the third clutch plate and extending entirely through the third clutch plate, the reverse strut partially positioned in the second strut cavity and displaced in the strut bore during rotation of the second clutch plate in the second rotational direction; and a fourth clutch plate axially rotatable with respect to a longitudinal axis of the clutch body, the fourth clutch plate including a U-shaped cavity facing the third clutch plate, the U-shaped cavity positioned in either a first position or a second position by axial rotation of the fourth clutch plate, the U-shaped cavity receiving a portion of the reverse strut in the second position to permit the reverse strut to displace in the strut bore.

\* \* \* \* \*